US008619033B2

(12) United States Patent
Tan et al.

(10) Patent No.: US 8,619,033 B2
(45) Date of Patent: Dec. 31, 2013

(54) METHOD AND SYSTEM FOR ADJUSTING DEPTH OF VIEW IN OPTICAL SENSOR

(76) Inventors: Min-Liang Tan, Singapore (SG); Chern Ann Ng, Singapore (SG)

( * ) Notice: Subject to any disclaimer, the term of this patent is extended or adjusted under 35 U.S.C. 154(b) by 1320 days.

(21) Appl. No.: 11/988,047

(22) PCT Filed: Jun. 29, 2005

(86) PCT No.: PCT/US2005/023158
§ 371 (c)(1),
(2), (4) Date: Dec. 28, 2007

(87) PCT Pub. No.: WO2007/005006
PCT Pub. Date: Jan. 11, 2007

(65) Prior Publication Data
US 2009/0207137 A1 Aug. 20, 2009

(51) Int. Cl.
G09G 5/08 (2006.01)
(52) U.S. Cl.
USPC .......................................... 345/166

(58) Field of Classification Search
USPC ........................................ 345/156, 163, 166
See application file for complete search history.

(56) References Cited

U.S. PATENT DOCUMENTS

| 7,427,981 B2 * | 9/2008 | DePue et al. ................. 345/166 |
| 2004/0143828 A1 * | 7/2004 | Liu et al. ....................... 717/168 |
| 2006/0187208 A1 * | 8/2006 | Wenstrand et al. ........... 345/166 |

* cited by examiner

*Primary Examiner* — Yong H Sim
(74) *Attorney, Agent, or Firm* — Andrew G. DiNovo; DiNovo Price Ellwanger & Hardy LLP

(57) ABSTRACT

Method and system are disclosed for adjusting the depth of view in an optical sensor of a pointing device (see FIG. 4). The method and system of the invention allow a user to select a depth of views from multiple depths of view. The user may select the depth of view using an appropriate graphical user interface. The depth of view may also be selected by the pointing device with no user input. In either case, the depth of view of the optical sensor may be adjusted to more accurately account for different levels of contrast in the micro-texture of the user's work surface.

23 Claims, 5 Drawing Sheets

METHOD AND SYSTEM FOR ADJUSTING DEPTH OF VIEW IN OPTICAL SENSOR

FIELD OF THE INVENTION

The present invention relates generally to optical pointing devices and, more particularly, to a method and system for transparently adjusting the depth of view modes in the optical sensors of such pointing devices.

BACKGROUND OF THE INVENTION

Computer input devices, such as mice, joysticks, rumble-pads, keyboards, keypads and the like, allow a user to interact with a computing device. Generally, the functionality of such devices varies according to the particular demands of the market segment. For example, players of computer games or simulations usually have heightened requirements relative to office users. To many users, the suitability of the device in question depends on the perceived overall feel, sensitivity, accuracy, flexibility and ease of use.

Computer mice in particular have undergone numerous improvements over the years since their first introduction to the computer industry. For example, early mice designs used a roller ball sensor with mechanical wheels and two or three buttons. Most modern mice, on the other hand, have optical sensors, a scroll wheel, and up to seven user-programmable buttons. These computer mice are part of a sub-category of computer input devices generally called pointing devices.

With roller ball mice, if the user physically runs out of room to move the mouse on the work surface (e.g., mouse pad, desk, etc.), he or she simply picks the mouse up and moves it back to the center. This is a common technique where, for example, the user needs to move the mouse cursor from one side of the display screen to the other side (or from one display screen to another if the user if using multiple display screens). With the roller ball airborne, the mouse is unable to detect any physical movement and therefore does not send any navigation signals to the computer. As a result, the cursor on the display screen simply freezes until the roller ball makes contact with the work surface again. The height or distance that the user has to move the mouse off the work surface is usually not a factor as long as the roller ball is not touching the work surface.

Picking up an optical mouse, however, may cause the cursor to move in various unintended directions. By way of explanation, the optical sensor in an optical mouse captures thousands of high contrast, low resolution images of the surface directly underneath the mouse per second. The images are taken by reflecting infrared light off the work surface and onto photosensors in the optical mouse. The captured images are then compared sequentially against one another to determine if the optical mouse has moved and in which directions. The optical mouse thereafter sends the appropriate navigation signals to the computer to cause the cursor on the display screen to move accordingly. For more information regarding the operation of an optical mouse, the reader is referred to U.S. Pat. Nos. 6,281,882 ("Proximity Detector for a Seeing Eye Mouse") and U.S. Pat. No. 6,442,780 ("Seeing Eye Mouse for a Computer System"), both of which are hereby incorporated by reference.

When the optical mouse is lifted off the work surface, the contrast in the captured images naturally degrades. If the degradation exceeds a certain threshold degradation level, a hold feature is activated that causes the optical sensor to ignore the captured images for purposes of navigating the mouse. This threshold degradation level is referred to herein as the "depth of view." When the depth of view is exceeded, the optical sensor stops detecting physical movement and the mouse stops reporting navigation signals to the computer.

Most mice manufacturers try to set the depth of view to coincide with the instant the mouse leaves the work surface. However, these manufacturers only use a single depth of view for all work surfaces. This one-size-fits-all approach does not account for the different types of work surfaces at the site of the end users. For example, if the user's work surface has a very high contrast micro-texture (i.e., lots of distinctive ridges, bumps, valleys, etc.), picking up the mouse may not degrade the captured images beyond the depth of view. Consequently, the optical sensor may continue to detect movement and the mouse may continue to report navigation signals to the computer. The result may be an unintended movement of the cursor, a player, an avatar, and the like.

Accordingly, what is needed is a way to be able to adjust the depth of view in an optical sensor of a pointing device to account for the different types of work surfaces at the site of the end users.

SUMMARY OF THE INVENTION

The present invention is directed to a method and system for adjusting the depth of view in an optical sensor of a pointing device. The method and system of the invention allow a user to select a depth of view from multiple depths of view. The user may select the depth of view using an appropriate graphical user interface. The depth of view may also be selected by the pointing device with no user input. In either case, the depth of view of the optical sensor may be adjusted to more accurately account for different levels of contrast in the micro-texture of the user's work surface.

In general, in one aspect, the invention is directed to a method of adjusting a depth of view in an optical sensor of a pointing device. The method comprises the steps of receiving a depth of view indicator for the optical sensor and determining a depth of view setting to be used for the optical sensor. The depth of view of the optical sensor is then changed to the determined depth of view setting.

In general, in another aspect, the invention is directed to a computing system. The computing system comprises a central processing unit, a pointing device connected to the central processing unit, and a computer-readable storage medium connected to the central processing unit. The computer-readable storage medium has computer-readable code stored thereon for causing the central processing unit to obtain a user-selected depth of view setting to be used for the pointing device from a plurality of depth of view settings and communicate information regarding the user-selected depth of view setting to the pointing device.

In general, in yet another aspect, the invention is directed to an optical pointing device. The optical pointing device comprises an optical sensor and a pointing device controller connected to the optical sensor. The pointing device controller is configured to facilitate selection of a depth of view setting for the optical sensor based on depth of view information received in the optical pointing device.

Other advantages and features of the invention will become apparent from the following descriptions, the drawings, and the claims.

BRIEF DESCRIPTION OF THE DRAWINGS

The foregoing and other advantages of the invention will become apparent from the following detailed description and upon reference to the drawings, wherein.

DESCRIPTION OF ILLUSTRATIVE EMBODIMENTS

Following is a detailed description of illustrative embodiments of the invention with reference to the drawings wherein the same reference labels are used for the same or similar elements.

Figure 1A:
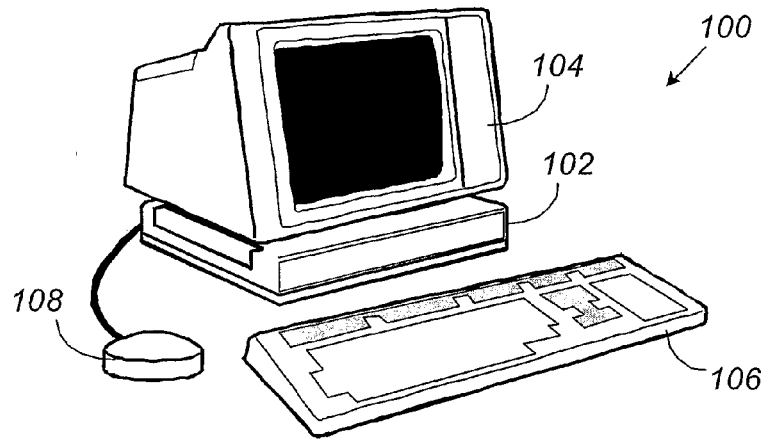
FIGS. 1a-b are a perspective view and a block diagram view, respectively, of an exemplary computing system according to embodiments of the invention.
Figure 1B:
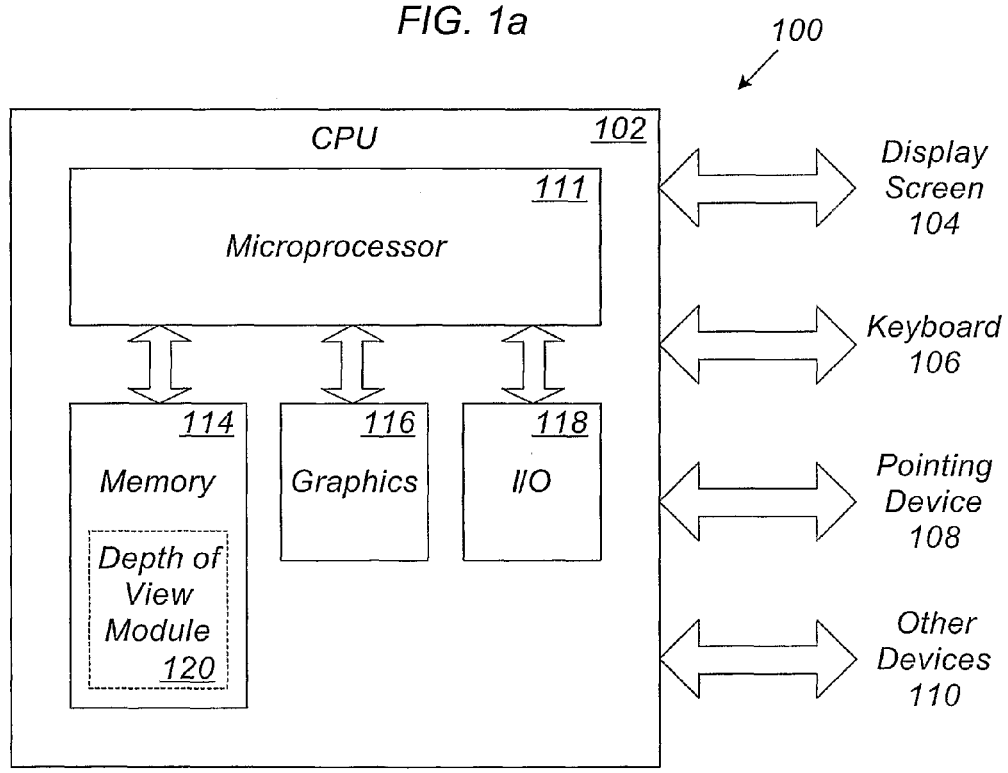

As alluded to above, the optical sensors in existing pointing devices have a single, one-size-fits-all depth of view setting. The present invention is directed to an improved pointing device, and particularly the optical sensor therein, that has multiple depth of view settings. Such a pointing device is illustrated in FIGS. 1a-b at 108. As can be seen in FIG. 1a, the pointing device 108 is part of a computing system 100 that includes a central processing unit (CPU) 102, a display screen 104, and a keyboard 106 (where appropriate), all interconnected in a manner known to those having ordinary skill in the art. Other devices 110 (see, FIG. 1b), such as printers, scanners, card readers, network interface units and the like, may also be connected to the central processing unit 102 without departing from the scope of the invention. The computing system 100 may be a standard computer (e.g., desktop, workstation, etc.), a mobile computer (e.g., laptop, personal digital assistant (PDA), etc.), a gaming device (e.g., Playstation, Xbox, etc.) and the like.

FIG. 1b illustrates the computing system 100 in block diagram form. As shown in this view, the central processing unit 102 is composed of a number of functional components, including a microprocessor 112, a memory unit 114, a graphics unit 116, and an input/output (I/O) unit 118. It should be noted that while a number of discrete functional components have been shown here, two or more of these components may be integrated into a single component and/or one component may be divided into several sub-components without departing from the scope of the invention. Moreover, one or more of these functional components may be removed as needed or additional components added to the central processing unit 112 without departing from the scope of the invention.

The operation of the various functional components is well known to those having ordinary skill in the art and will be described only briefly here. In general, the microprocessor 112 is responsible for the overall operation of the computing system 100, including execution of a software operating system and any software applications that may be run thereon. The memory unit 114, which may be any suitable data storage unit (e.g., magnetic storage, optical storage, random access memory (RAM), erasable read-only memory, etc.), provides both temporary and long-term storage of any data and software programs used by the computing system 100. The graphics unit 116 controls the display and refresh of the various pictures and video images that are displayed on the display screen 104. Last but not least, the input/output unit 118 facilitates the transfer of data between the components of the central processing unit 102 and the various external devices that are connected to the central processing unit 102.

In accordance with embodiments of the invention, a depth of view module 120 is executed on the computing system 100 for adjusting the depth of view setting of the pointing device 108. The depth of view module 120, or a computer-readable code version of the module 120, may be stored in the memory unit 114 and run as needed by the user via the microprocessor 112. Such a depth of view module 120 may be a separate application that is installed on the computing system 100 independently of the software operating system, or it may be an integrated component (i.e., an accessory) of the software operating system. In either case, the depth of view module 120 allows the user to dynamically change (i.e., in real-time) the depth of view setting of the pointing device 108 in a manner that is completely transparent to the user.

Figure 2:
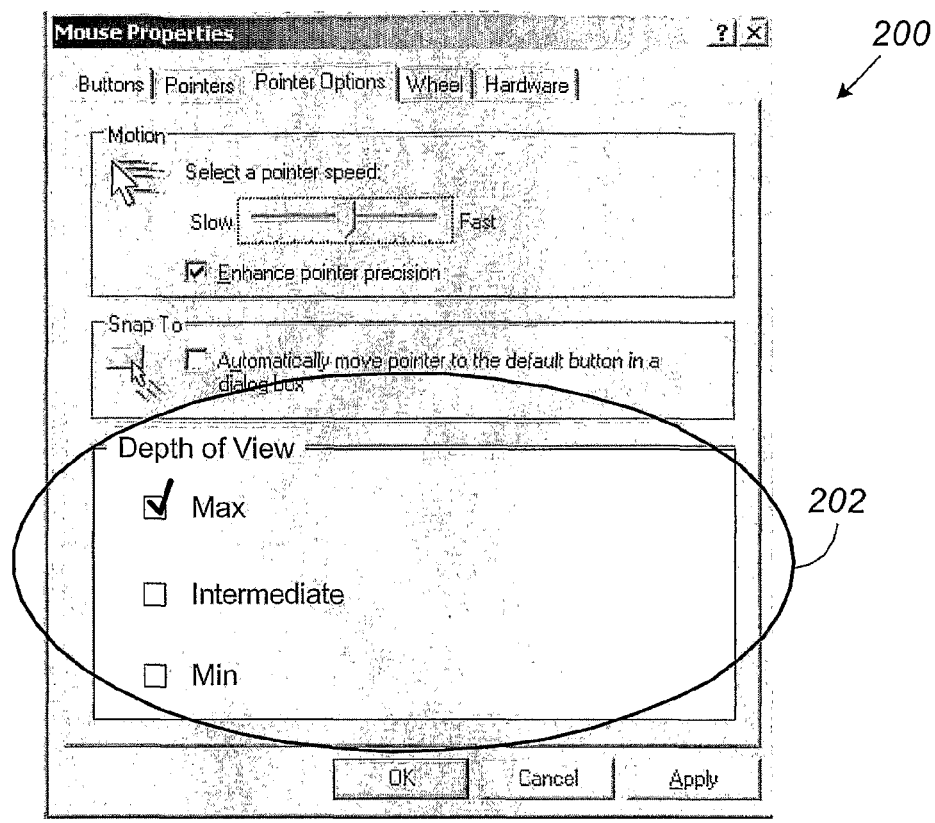
FIG. 2 is a graphical user interface for allowing a user to change the depth of view setting of a pointing device according to embodiments of the invention.

In one embodiment, the depth of view module 120 provides a graphical user interface for allowing the user to adjust the depth of view setting of the pointing device 108. An exemplary implementation of the graphical user interface is shown in FIG. 2 at 200. As can be seen, the graphical user interface 200 may be implemented as a separate pointing device graphical user interface that is independent of the operating system, or it may be implemented as an add-on to the operating system's existing pointing device graphical user interface. In one embodiment, the graphical user interface 200 includes a plurality of check boxes 202 representing the different depth of view settings that are available in the pointing device 108. Other implementations may certainly use a different selection mechanism, such as a slider, without departing from the scope of the invention. The user may then select one of the depth of view settings by checking the appropriate check box. The operating system thereafter sends a signal to the pointing device 108 in a manner known to those having ordinary skill in the art to indicate the newly selected depth of view setting.

In the example shown in FIG. 2, there are three exemplary depth of view settings: "Max," "Intermediate," and "Min" settings. It is contemplated that the "Max" setting is the most appropriate for a high contrast work surface (e.g., wood), the "Intermediate" setting for a medium contrast work surface (e.g., metal), and the "Min" setting for a low contrast work surface (e.g., glass). However, the user may wish to experiment with all three settings until he or she finds the setting that results in satisfactory operation of his or her pointing device 108. For example, the user may select one of the settings, then pick up the pointing device and move it around to see whether the cursor, player, avatar, or the like, tracks the movement of the pointing device. If it does, then the user should select a different depth of view setting until the pointing device stops tracking the movement when picked up.

Figure 3:
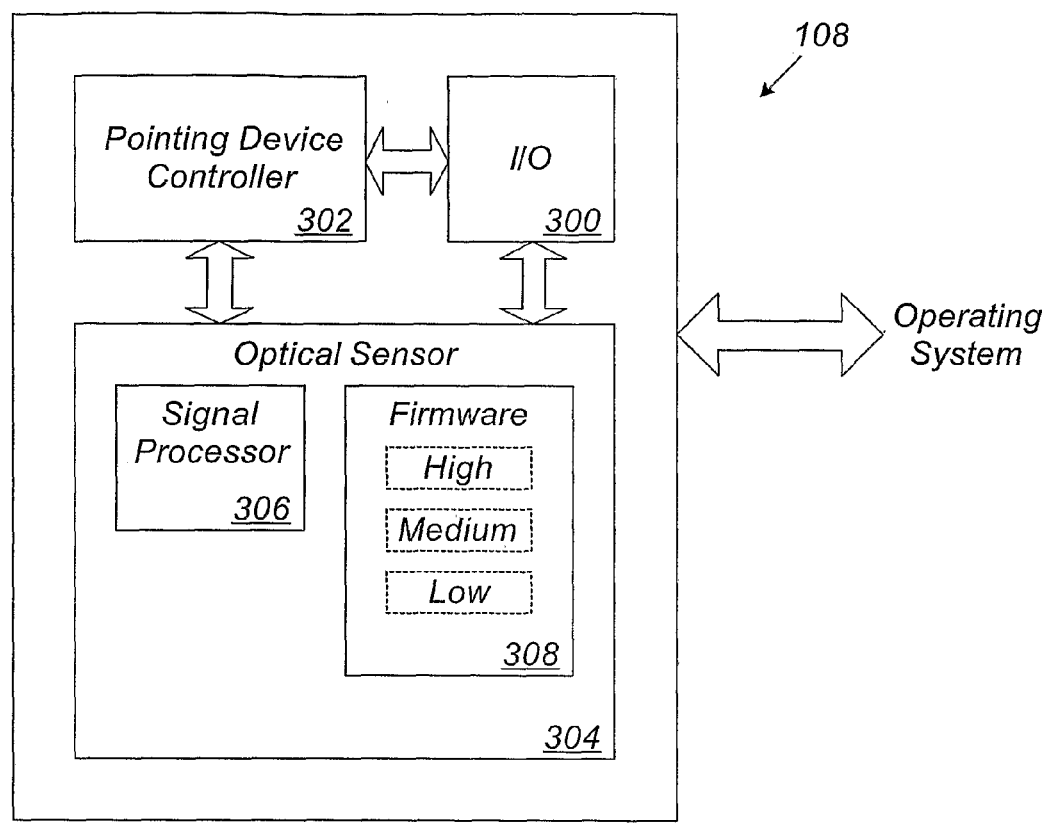
FIG. 3 is a block diagram of a pointing device having multiple depth of view settings according to embodiments of the invention.

FIG. 3 illustrates a block diagram of the pointing device 108, which may be any suitable optical pointing device, including an optical mouse, a joystick, a steering wheel, and the like. In accordance with embodiments of the invention, the pointing device 108 may be configured to use one of several depth of view settings based on the input of the user (via the graphical user interface 200). Furthermore, the pointing device 108 may have an 8-bit, 16-bit, 42-bit, or wider data bus, and it may be wired or wireless (e.g., infrared, radiofrequency, etc.).

As can be seen, the pointing device 108 includes a number of functional components, such as an input/output (I/O) unit 300, a pointing device controller 302, and an optical sensor 304. In some embodiments, it is possible to combine two or more of these functional components into a single component, or to divide one of these components into several sub-components, without departing from the scope of the invention. It is also possible to add or remove one or more functional components as needed without departing from the scope of the invention. Each of these components will be described briefly below.

The I/O unit 300 facilitates communication between the pointing device 108 and the central processing unit 102 (see FIGS. 1a-b). Specifically, the I/O unit 300 ensures that the depth of view module 120 and the pointing device controller 302 are using the appropriate communications protocol (e.g., serial, PS2, USB, Wi-Fi, Bluetooth, etc.). The pointing device controller 302 is responsible for the overall operation of the pointing device 108, including receiving the navigation data from the optical sensor 304, processing the data in some cases, and forwarding that data to the central processing unit 102 (and the depth of view module 120 therein). The pointing device controller 302 is also responsible for processing the signals from any buttons on the pointing device 108. The optical sensor 304, which may be any suitable optical sensor known to those having ordinary skill in the art, detects the physical movement of the pointing device 108 and converts the movements into navigation data.

In one embodiment, the optical sensor 304 includes a signal processor component 306 that processes (e.g., compares) the captured images. The signal processor component 306 is configured to detect, based on the captured images, whether the pointing device 108 has moved. This detection is typically provided in terms of a horizontal (X) and a vertical (Y) displacement. The signal processor component 306 is also configured to detect whether the level of contrast of the images has degraded beyond the depth of view setting (e.g., because the pointing device 108 has been picked up). If the signal processor component 306 determines that the level of image contrast has degraded beyond the depth of view setting, then it simply ignores or stops processing the images, thereby holding the cursor, player, avatar, or the like, in the previous position on the display screen 104.

The particular depth of view setting referenced by signal processor component 306 may set based on input provided by the user (via the graphical user interface 200). In general, the depth of view setting used by the optical sensor 304 may be determined as needed, either by the pointing device controller 302 or the optical sensor 304, or it may be selected from several predefined settings stored as firmware in a firmware storage media 308 and loaded at the time the pointing device 108 (and the optical sensor 304 therein) is powered up. The firmware storage media 308 may any suitable firmware storage media, such as one or more read-only memories or erasable programmable read-only memories, and it may be part of the optical sensor 304 or it may be a separate component from the optical sensor 304.

In one embodiment, the optical sensor 304 may use a separate version of the firmware for each depth of view setting, depending on the user-selected depth of view setting. For example, there may be one version that uses a high depth of view setting, another version that uses a medium depth of view setting, and yet another version that uses a low depth of view setting. The particular firmware version used may be selected by the pointing device controller 302 based on the user depth of view information from the depth of view module 120. Upon receiving the depth of view information, the pointing device controller 302 selects the appropriate version of the firmware from the firmware storage media 308 to be loaded to the optical sensor 304.

In another embodiment, the same firmware version may be loaded from the firmware storage media 308 every time the optical sensor 304 is powered on, but the specific depth of view setting specified by the firmware version is based on a variable received from the pointing device controller 302. This depth of view variable is provided to the pointing device controller 302 via a communication from the depth of view module 120 and preferably corresponds to the user-selected depth of view setting. Upon receiving the depth of view variable from the pointing device controller 302, the firmware may either determine (e.g., calculate) a depth of view setting or select one of the available depth of view settings (e.g., "High," "Medium," or "Low") based on the value of the received depth of view variable.

In some embodiments, the pointing device controller 302 may use a lookup table to determine the appropriate firmware version to be loaded. The lookup table may be stored, for example, in the firmware storage media 308. An exemplary lookup table is shown in TABLE 1 below. Based on this conceptual table, the pointing device controller 302 will load (or cause to be loaded) a high depth of view firmware version if the user selects a "Max" setting, a medium depth of view firmware version if the user selects an "Intermediate" setting, and low depth of view firmware version if the user selects a "Min" setting.

TABLE 1

| User Selection | Firmware Version | Depth of View |
| --- | --- | --- |
| Max | High | High |
| Intermediate | Medium | Medium |
| Min | Low | Low |

A lookup table may also be used where a variable is passed to the firmware for selecting a depth of view setting. In that case, the firmware may look up the appropriate depth of view setting to be used based on the value of the depth of view variable. An example of such a lookup table is shown in TABLE 2 below. Based on this conceptual table, the firmware will select a high depth of view setting if the variable is a "3," a medium depth of view setting if the variable is a "2," and a low depth of view setting if the variable is a "1." As stated above, the variable values (which are exemplary only) and the resulting depth of view setting selected by the firmware preferably correspond to the depth of view selections chosen by the user.

TABLE 2

| User Selection | Variable | Depth of View |
| --- | --- | --- |
| Max | 3 | High |
| Intermediate | 2 | Medium |
| Min | 1 | Low |

It is also possible to adjust the depth of view setting without any user input. In one implementation, the depth of view module 120 (see FIG. 1b) may instruct the user to pick up his or her pointing device 108 from the work surface and hold it a user-preferred distance above the work surface. The user may be asked to hold the pointing device 108 for a predetermined amount of time or until instructed otherwise. The depth of view module 120 may thereafter communicate a signal to the pointing device 108 to select a depth of view setting based on the resulting amount of image contrast.

Figure 4:
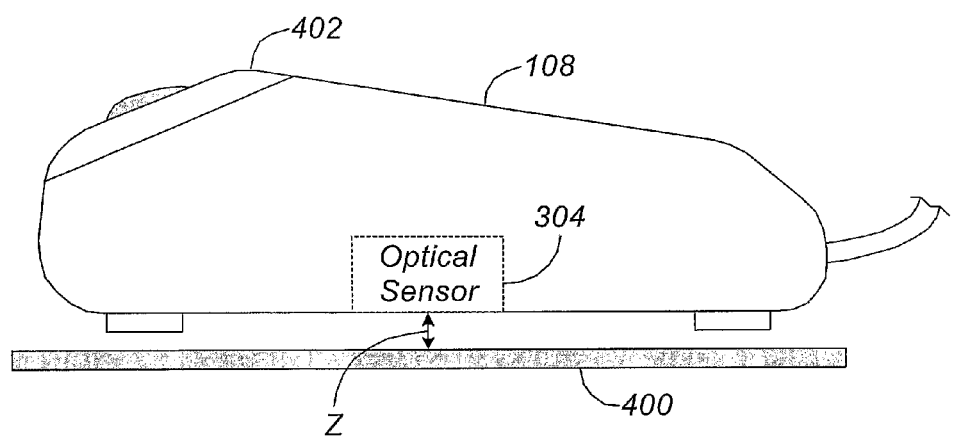
FIG. 4 is a side view of a pointing device having multiple depth of view settings according to embodiments of the invention.

The above embodiment is illustrated in FIG. 4, where "Z" indicates the vertical distance that the pointing device 108 is being held above a work surface 400. The vertical distance "Z" may be, for example, a few millimeters for a low contrast surface or more it may be greater for a high contrast surface. The depth of view module 120 then communicates a signal to the pointing device 108 telling it to record the depth of view setting corresponding to the amount of image contrast currently resulting from the optical device 108 being held aloft by the distance "Z." This communication from the depth of view module 120 to the pointing device 108 may be made in any manner known to those having ordinary skill in the art.

Within the pointing device 108, the pointing device controller 302 receives the communication from the depth of view module 120 and instructs the optical sensor 304 to record the level of image contrast currently resulting from the optical device 108 being held aloft. The pointing device controller 302 then instructs the optical sensor 304 to set a depth of view setting based on the recorded level of image contrast. In some embodiments, the optical sensor 304 may use the recorded level of image contrast, or a calculated version thereof, as the depth of view setting, or it may select the depth of view setting from a plurality of depth of view settings using the recorded level of image contrast (e.g., via a lookup table). The distance "Z" in these embodiments is thus equivalent to, or is otherwise indicative of, the depth of view setting. Thereafter, each time the user lifts the pointing device 108 by the distance "Z" or higher, the optical sensor 304 stops detecting movement and the pointing device 108 stops sending navigation signals to the central processing unit 102.

In some embodiments, one or more buttons 402 on the exterior of the pointing device 108 may be used to instruct the optical sensor 304 (via the pointing device controller 302) to record the amount of image contrast currently resulting from the optical device 108 being held aloft by the distance "Z." For example, the one or more buttons 402 may be pressed in a certain sequence or a certain combination to record the amount of image contrast and thereby set the depth of view setting. The one or more buttons 402 may be conventional buttons typically found on pointing devices 108 in general (e.g., left and right buttons on a mouse), or they may be one or more buttons that have been customized for the pointing device 108.

The depth of view of the pointing device 108 may also be automatically adjusted by the optical sensor 304 based on the micro-texture of the particular type of work surface 400 being used (i.e., with no user input). For example, during the power on sequence, while the pointing device 108 is resting on the work surface 400, the pointing device controller 302 may instruct the optical sensor 304 to record the resulting level of image contrast. Alternatively, the optical sensor 304 may be programmed to automatically record the resulting level of image contrast when powering up. This recorded level of image contrast (or a calculated version thereof) may thereafter be set by the optical sensor 304 as the new depth of view setting, or otherwise used to select a new setting from one of several predefined depth of view settings (e.g., via a lookup table). If the level of image contrast of subsequently captured images exceeds the new depth of view setting, the optical sensor 304 stops detecting movement and the pointing device 108 stops sending navigation signals. In some embodiments, instead of (or in addition to) being done at power up, the above depth of view adjustment may be performed on command by the user, for example, via a graphical user interface connected with the operating system or via a sequence or combination of button pushes on the pointing device 108.

Figure 5:
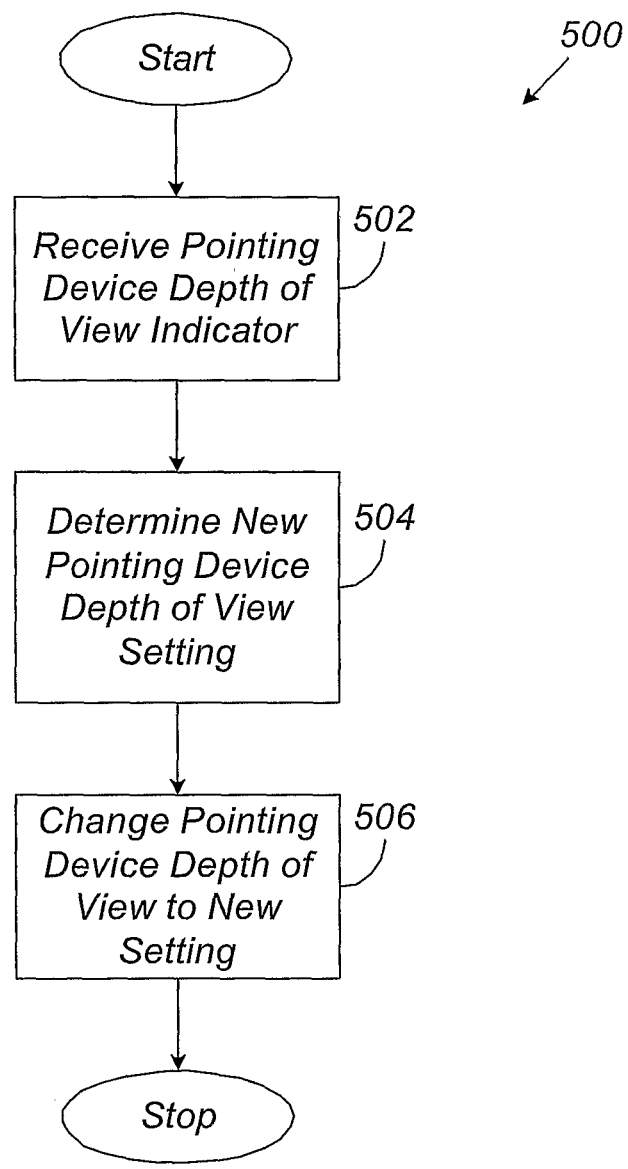
FIG. 5 is a flow diagram for a method of changing the depth of view for a pointing device according to embodiments of the invention.

FIG. 5 illustrates an exemplary method 500 according to embodiments of the invention that may be used to change the depth of view setting of the pointing device 108. As can be seen, the method 500 begins at step 502, where a pointing device depth of view indicator is received. In one embodiment, the pointing device depth of view indicator may be a signal from the depth of view module 120 via the central processing unit 102 indicating a new depth of view for the pointing device 108. The signal may include a user-selected depth of view setting that is selected by the user through a graphical user interface of the depth of view module 120, or it may only include a variable that corresponds to the user-selected depth of view setting that is then used to determine the appropriate depth of view setting.

In another embodiment, the pointing device depth of view indicator may be information that the pointing device has obtained without user input, for example, by the user holding the pointing device 108 above the work surface 400 or while the pointing device 108 is resting on the work surface 400. This information may be the level of image contrast resulting from the pointing device 108 being held above the work surface 400 or resting on the work surface 400.

At step 504, a new pointing device depth of view setting is determined. The determination may be made through the pointing device controller 302 based on the depth of view information received from the depth of view module 120. In one embodiment, the pointing device controller 302 may instruct the optical sensor 304 to load a specific firmware version 308 corresponding to the user-selected depth of view setting.

In another embodiment, the pointing device controller 302 may simply pass a depth of view variable to the firmware of the optical sensor 304. The firmware 308 of the optical sensor 304 may then use the depth of view variable to select an appropriate depth of view setting. A lookup table may be used to look up the appropriate depth of view setting in either case.

In yet another embodiment, the pointing device controller 302 may instruct the optical sensor 304 to set the depth of view setting based on the recorded level of image contrast while the pointing device 108 is being held above the work surface 400 or resting on the work surface 400. The optical sensor may thereafter set the depth of view setting at the recorded level of image contrast (or a calculated version thereof), or it may use the recorded level of image contrast to select a new setting from several predefined depth of view settings (e.g., via a lookup table).

At step 506, the depth of view setting of the pointing device 108 is changed to the new setting. The signal processor 306 of the optical sensor 304 thereafter uses the new depth of view setting to process the captured images and determine whether the pointing device 108 has moved. The result is a process that allows the depth of view setting to be changed to more closely match the user-selected setting in a manner that is completely transparent to the user.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

The invention claimed is:

1. A method of selecting a depth of view in an optical sensor of a pointing device, said pointing device generally operating in physical contact with a work surface, comprising:

providing a plurality of predetermined depth of view settings for the optical sensor;

receiving a depth of view setting for the optical sensor, the depth of view setting being one of a first depth of view setting and a second depth of view setting;

selecting one of the plurality of predetermined depth of view settings to he a selected depth of view setting, the selected depth of view setting corresponding to the received depth of view setting;

loading the optical sensor with a single firmware version from at least one firmware version in the optical sensor, the single firmware version corresponding to the selected depth of view setting; and changing the depth of view of the optical sensor to the selected depth of view setting, wherein the depth of view setting is defined by different levels of image contrast in the micro-texture of the work surface;

wherein the first depth of view setting corresponds to a level of image contrast recorded in the optical sensor;

wherein the second depth of view setting is chosen by a user from the plurality of predetermined depth of view settings; and wherein each of the at least one firmware version corresponds to one of the plurality of predetermined depth of view settings.

2. The method according to claim 1, wherein the step of receiving the depth of view setting further comprises communicating the depth of view setting to the optical sensor of the pointing device.

3. The method according to claim 2, wherein the optical sensor has a single firmware version and the step of selecting the selected depth of view setting comprises passing to the single firmware version the depth of view settings chosen by the user.

4. The method according to claim 3, wherein the step of selecting the selected depth of view setting further comprises the single firmware version selecting the selected depth of view setting to be used.

5. The method according to claim 1, wherein the step of receiving the depth of view setting comprises asking the user to hold the pointing device stationary above the work surface and communicating instructions to the optical sensor to record the level of image contrast resulting from the pointing device being held stationary above the work surface.

6. The method according to claim 5, wherein the step of selecting the selected depth of view setting corresponds to the recorded level of image contrast resulting from the pointing device being held stationary above the work surface.

7. The method according to claim 1, wherein the step of receiving the depth of view setting comprises recording in the optical sensor a level of image contrast resulting from the pointing device resting on the work surface.

8. The method according to claim 7, wherein the step of selecting the selected depth of view setting corresponds to the recorded level of image contrast resulting from the pointing device resting on the work surface.

9. The method according to claim 1, wherein at least one non-transitory computer-readable storage medium are encoded with instructions for causing a computing device to select a depth of view in the optical sensor of the pointing device.

10. The method according to claim 1, wherein the recording of the level of image contrast corresponding to the first depth of view setting occurs in response to one of powering on the pointing device and actuating at least one button on the pointing device.

11. The method according to claim 1, wherein the choosing of the second depth of view setting from the plurality of predetermined depth of view settings by the user comprises actuating a selection mechanism on the pointing device.

12. A computing system, comprising:
a central processing unit;
a pointing device connected to the central processing unit, said pointing device generally operating in physical contact with a work surface; and
a non-transitory computer-readable storage medium connected to the central processing unit, the non-transitory computer-readable storage medium having computer-readable code stored thereon for causing the central processing unit to:
provide a plurality of predetermined depth of view settings for the optical sensor;
obtain a depth of view setting for the optical sensor, the depth of view setting being one of a first depth of view setting and a second depth of view setting;
select a depth of view setting to be used for the pointing device from the plurality of predetermined depth of view settings, the selected depth of view setting corresponding to the obtained depth of view setting;
communicate information regarding the selected depth of view setting to the pointing device;
load the optical sensor with a single firmware version from at least one firmware version in the optical sensor, the single firmware version corresponding to the selected depth of view setting; and
change the depth of view of the optical sensor to the selected depth of view setting,
wherein the depth of view setting is defined by different levels of image contrast in the micro-texture of the work surface,
wherein the first depth of view setting corresponds to a level of image contrast recorded in the optical sensor;
wherein the second depth of view setting is chosen by a user from the plurality of predetermined depth of view settings; and
wherein each of the at least one firmware version corresponds to one of the plurality of predetermined depth of view settings.

13. The computing system of claim 12, wherein the central processing unit includes one or more of a desktop computer, a laptop computer, a gaming device, and a personal digital assistant.

14. The computing system of claim 12, wherein the pointing device is an optical mouse.

15. The computing system of claim 12, wherein the recording of the level of image contrast corresponding to the first depth of view setting occurs in response to one of powering on the pointing device and actuating at least one button on the pointing device.

16. An optical pointing device generally operating in physical contact with a work surface, comprising:
an optical sensor;
a pointing device controller connected to the optical sensor, the pointing device controller configured to facilitate selection of a depth of view setting from a plurality of predetermined depth of view settings for the optical sensor based on a depth of view information received in the optical pointing device, the depth of view information being one of a first depth of view setting and a second depth of view setting; and
a firmware storage medium having at least one firmware version stored thereon, each firmware version corresponding to one of the plurality of predetermined depth of view settings, wherein the selection of the depth of view setting comprises loading a single firmware version from the at least one firmware version, the single firmware version corresponding to the selected depth of view setting;

wherein the first depth of view setting corresponds to a level of image contrast recorded in the optical sensor;

wherein the second depth of view setting is chosen by a user from the plurality of predetermined depth of view settings; and wherein the depth of view setting is defined by different levels of image contrast in the micro-texture of the work surface.

17. The optical pointing device of claim 16, the firmware storage medium having a single firmware version stored thereon, wherein the pointing device controller facilitates the selection of the depth of view setting by passing the depth of view information to the single firmware version, the single firmware version configured to select the depth of view setting using the depth of view information.

18. The optical pointing device of claim 16, wherein the first depth of view setting is obtained by instructing the optical sensor to record the level of image contrast resulting from the pointing device being held stationary above the work surface.

19. The optical pointing device of claim 16, wherein the first depth of view setting is obtained by instructing the optical sensor to record the level of image contrast resulting from the pointing device resting on the work surface.

20. The optical pointing device of claim 16, wherein the first depth of view setting is obtained by allowing the optical sensor to automatically record the level of image contrast resulting from the pointing device resting on the work surface.

21. The computing system of claim 16, wherein the pointing device comprises a selection mechanism for the user to choose the second depth of view setting from the plurality of predetermined depth of view settings.

22. The optical pointing device of claim 16, wherein the recording of the level of image contrast corresponding to the first depth of view setting occurs in response to one of powering on the pointing device and actuating at least one button on the pointing device.

23. The optical pointing device of claim 16, further comprising a selection mechanism for the user to choose the second depth of view setting from the plurality of predetermined depth of view settings.

\* \* \* \* \*